US012652096B2

(12) United States Patent
Guo et al.

(10) Patent No.: US 12,652,096 B2
(45) Date of Patent: Jun. 9, 2026

(54) SL AND UL FULL-DUPLEX DETERMINATION IN RESOURCE ALLOCATION MODE 1

(71) Applicant: QUALCOMM Incorporated, San Diego, CA (US)

(72) Inventors: Hui Guo, Beijing (CN); Kapil Gulati, Belle Mead, NJ (US); Junyi Li, Fairless Hills, PA (US); Navid Abedini, Basking Ridge, NJ (US); Shuanshuan Wu, San Diego, CA (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 18/272,557

(22) PCT Filed: Mar. 8, 2021

(86) PCT No.: PCT/CN2021/079518
§ 371 (c)(1),
(2) Date: Jul. 14, 2023

(87) PCT Pub. No.: WO2022/187994
PCT Pub. Date: Sep. 15, 2022

(65) Prior Publication Data
US 2024/0080115 A1 Mar. 7, 2024

(51) Int. Cl.
*H04B 7/06* (2006.01)
*H04B 17/345* (2015.01)
(Continued)

(52) U.S. Cl.
CPC ....... *H04B 7/06954* (2023.05); *H04B 17/345* (2015.01); *H04L 5/14* (2013.01); *H04W 24/08* (2013.01)

(58) Field of Classification Search
CPC ..... H04B 7/06954; H04B 17/345; H04L 5/14; H04L 5/0048; H04W 24/08; H04W 24/10;
(Continued)

(56) References Cited

U.S. PATENT DOCUMENTS

| | | | |
|---|---|---|---|
| 2018/0041326 A1* | 2/2018 | Kazmi | ..................... H04L 5/14 |
| 2018/0124718 A1* | 5/2018 | Ng | ..................... H04W 56/001 |

(Continued)

FOREIGN PATENT DOCUMENTS

| | | |
|---|---|---|
| CN | 106059649 A | 10/2016 |
| CN | 107124245 A | 9/2017 |

(Continued)

OTHER PUBLICATIONS

Supplementary European Search Report—EP21929477—Search Authority—The Hague—Oct. 21, 2024.
(Continued)

*Primary Examiner* — Obaidul Huq
(74) *Attorney, Agent, or Firm* — Procopio, Cory, Hargreaves & Savitch LLP/QUALCOMM Incorporated

(57) ABSTRACT
Apparatus, methods, and computer program products for full-duplex determination are provided. An example method includes transmitting a Uu signal from the UE. The example method further includes performing a self-interference measurement (SIM) of the Uu signal for full-duplex reception at the UE using the sidelink interface.

31 Claims, 11 Drawing Sheets

(51) Int. Cl.
   *H04L 5/14*      (2006.01)
   *H04W 24/08*      (2009.01)

(58) Field of Classification Search
   CPC . H04W 72/541; H04W 52/365; H04W 88/06;
   H04W 92/18; H04W 72/25; H04W
   72/0446; H04W 72/0453
   USPC .................................................. 370/241, 252
   See application file for complete search history.

(56)                References Cited

U.S. PATENT DOCUMENTS

| | | | | |
|---|---|---|---|---|
| 2018/0287739 | A1* | 10/2018 | Kim ...................... | H04J 11/0023 |
| 2019/0260485 | A1* | 8/2019 | Byun ...................... | H04W 4/40 |
| 2020/0052775 | A1* | 2/2020 | Nam .......................... | H04L 5/14 |
| 2020/0170059 | A1* | 5/2020 | Belleschi ................ | H04W 8/22 |
| 2020/0178221 | A1 | 6/2020 | Byun et al. | |
| 2021/0067992 | A1 | 3/2021 | Kusashima et al. | |
| 2022/0069884 | A1* | 3/2022 | Zhang ................. | H04B 7/0695 |
| 2022/0103999 | A1* | 3/2022 | Zhang ............... | H04W 72/0446 |
| 2022/0159596 | A1* | 5/2022 | Kim .......................... | H04J 11/00 |
| 2022/0216976 | A1* | 7/2022 | Zhang .................. | H04L 5/0073 |

| | | | | |
|---|---|---|---|---|
| 2023/0132757 | A1 | 5/2023 | Kang | |
| 2023/0309126 | A1* | 9/2023 | Suh ....................... | H04L 5/0053 |
| 2023/0336213 | A1* | 10/2023 | Kim ...................... | H04W 72/21 |

FOREIGN PATENT DOCUMENTS

| | | |
|---|---|---|
| CN | 111988866 A | 11/2020 |
| KR | 20190097171 A | 8/2019 |
| WO | 2019164363 A1 | 8/2019 |

OTHER PUBLICATIONS

International Search Report and Written Opinion—PCT/CN2021/079518—ISA/EPO—Dec. 8, 2021.

LG Electronics Inc: "Introduction of 5G V2X With NR Sidelink", 3GPP TSG-RAN WG2 Meeting #109-e, R2-2002264, Mar. 6, 2020 (Mar. 6, 2020), 18 Pages, the whole document.

3GPP: "3rd Generation Partnership Project, Technical Specification Group Radio Access Network; NR, Physical layer procedures for data (Release 16)", 3GPP TS 38.214 V16.6.0 (Jun. 2021), pp. 1-172, Sections 8.1 through 8.1.4.

* cited by examiner

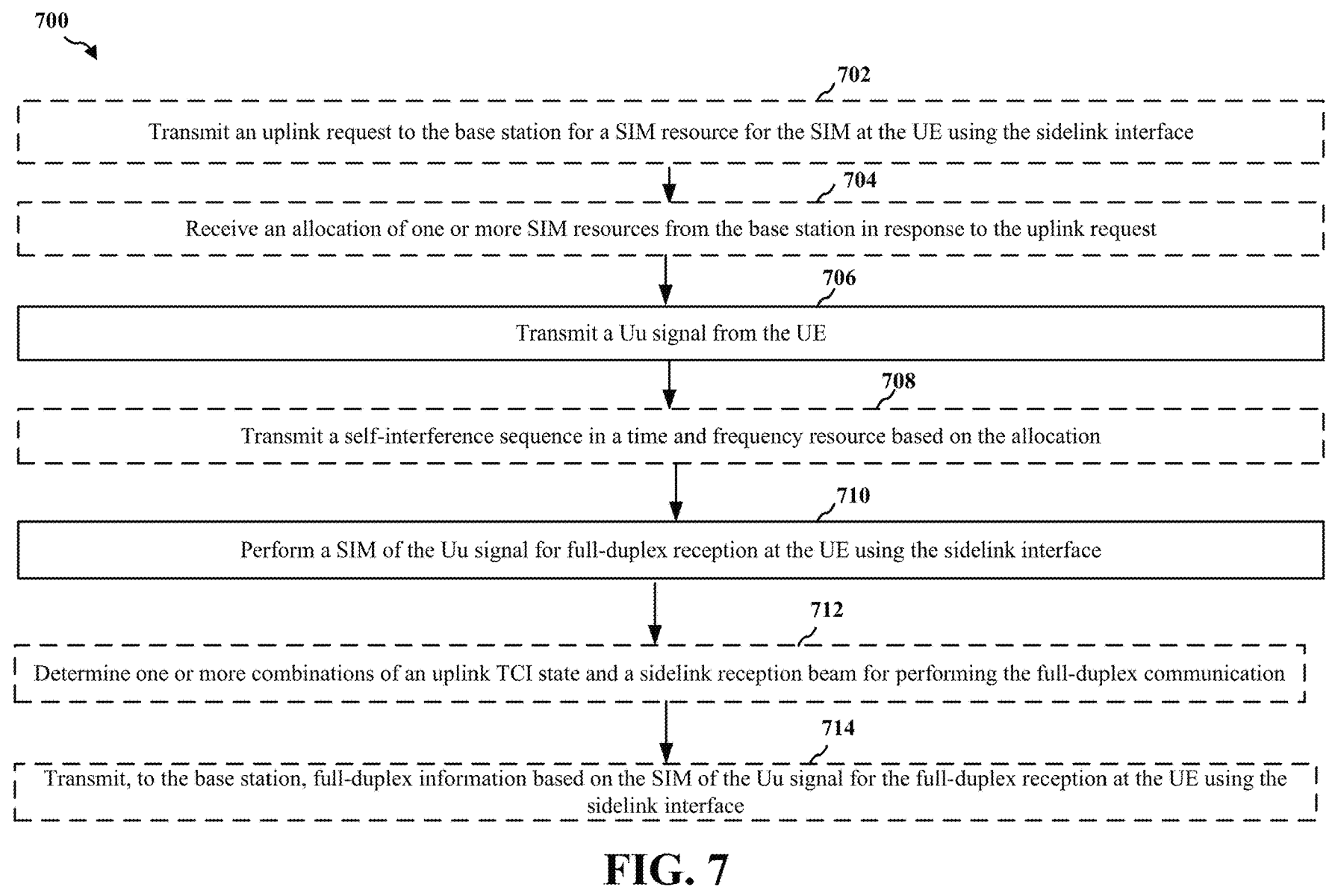

700

702  Transmit an uplink request to the base station for a SIM resource for the SIM at the UE using the sidelink interface 704  Receive an allocation of one or more SIM resources from the base station in response to the uplink request 706  Transmit a Uu signal from the UE 708  Transmit a self-interference sequence in a time and frequency resource based on the allocation 710  Perform a SIM of the Uu signal for full-duplex reception at the UE using the sidelink interface 712  Determine one or more combinations of an uplink TCI state and a sidelink reception beam for performing the full-duplex communication 714  Transmit, to the base station, full-duplex information based on the SIM of the Uu signal for the full-duplex reception at the UE using the sidelink interface

FIG. 7

902 Receive, from the UE, full-duplex information for a full-duplex mode of the UE, the full-duplex mode including Uu transmission and sidelink reception at the UE 904 Allocate one or more resources based on the full-duplex information from the UE 906 Schedule uplink resources for the UE based on the uplink TCI state indicated by the UE

900

SL AND UL FULL-DUPLEX DETERMINATION IN RESOURCE ALLOCATION MODE 1

CROSS REFERENCE TO RELATED APPLICATION(S)

This application is a National Stage Application filed under 35 U.S.C. § 371 of PCT International Application No. PCT/CN2021/079518, entitled "SL AND UL FULL-DU-PLEX DETERMINATION IN RESOURCE ALLOCA-TION MODE 1" and filed Mar. 8, 2021, which is expressly incorporated by reference herein in its entirety.

INTRODUCTION

The present disclosure relates generally to communication systems, and more particularly, to wireless communication systems with sidelink (SL) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a user equipment (UE) having a Uu connection with a base station and having a capability for full-duplex communication based on the Uu connection and a sidelink interface is provided. An example method may include transmitting a Uu signal. The example method further includes performing a self-interference measurement (SIM) of the Uu signal for full-duplex reception at the UE using the sidelink interface.

In another aspect of the disclosure, an apparatus for wireless communication at a user equipment (UE) having a Uu connection with a base station and having a capability for full-duplex communication based on the Uu connection and a sidelink interface is provided. The apparatus includes a memory and at least one processor coupled to the memory, the memory and the at least one processor may be configured to transmit a Uu signal and perform a SIM of the Uu signal for full-duplex reception at the UE using the sidelink interface.

In another aspect of the disclosure, an apparatus for wireless communication at a user equipment (UE) having a Uu connection with a base station and having a capability for full-duplex communication based on the Uu connection and a sidelink interface is provided. The apparatus includes means for transmitting a Uu signal and means for performing a SIM of the Uu signal for full-duplex reception at the UE using the sidelink interface.

In another aspect of the disclosure, a computer-readable storage medium storing computer executable code for wireless communication at a user equipment (UE) having a Uu connection with a base station and having a capability for full-duplex communication based on the Uu connection and a sidelink interface is provided, the code when executed by a processor causes the processor to transmit a Uu signal and perform a SIM of the Uu signal for full-duplex reception at the UE using the sidelink interface.

In another aspect of the disclosure, an example method at a base station having a Uu connection with a UE includes receiving, from the UE, full-duplex information for a full-duplex mode of the UE, the full-duplex mode including Uu transmission and sidelink reception at the UE. The example method further includes allocating one or more resources based on the full-duplex information from the UE.

In another aspect of the disclosure, an example apparatus at a base station having a Uu connection with a UE includes a memory and at least one processor coupled to the memory, the memory and the at least one processor may be configured to receive, from the UE, full-duplex information for a full-duplex mode of the UE, the full-duplex mode including Uu transmission and sidelink reception at the UE and allocate one or more resources based on the full-duplex information from the UE.

In another aspect of the disclosure, an example apparatus at a base station having a Uu connection with a UE may include means for receiving, from the UE, full-duplex information for a full-duplex mode of the UE, the full-duplex mode including Uu transmission and sidelink reception at the UE and means for allocating one or more resources based on the full-duplex information from the UE.

In another aspect of the disclosure, an example computer-readable storage medium at a base station having a Uu connection with a UE may store computer executable code, the code when executed by a processor causes the processor to receive, from the UE, full-duplex information for a full-duplex mode of the UE, the full-duplex mode including Uu transmission and sidelink reception at the UE and allocate one or more resources based on the full-duplex information from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a flowchart of a method of wireless communication.

DETAILED DESCRIPTION

Figure 1:
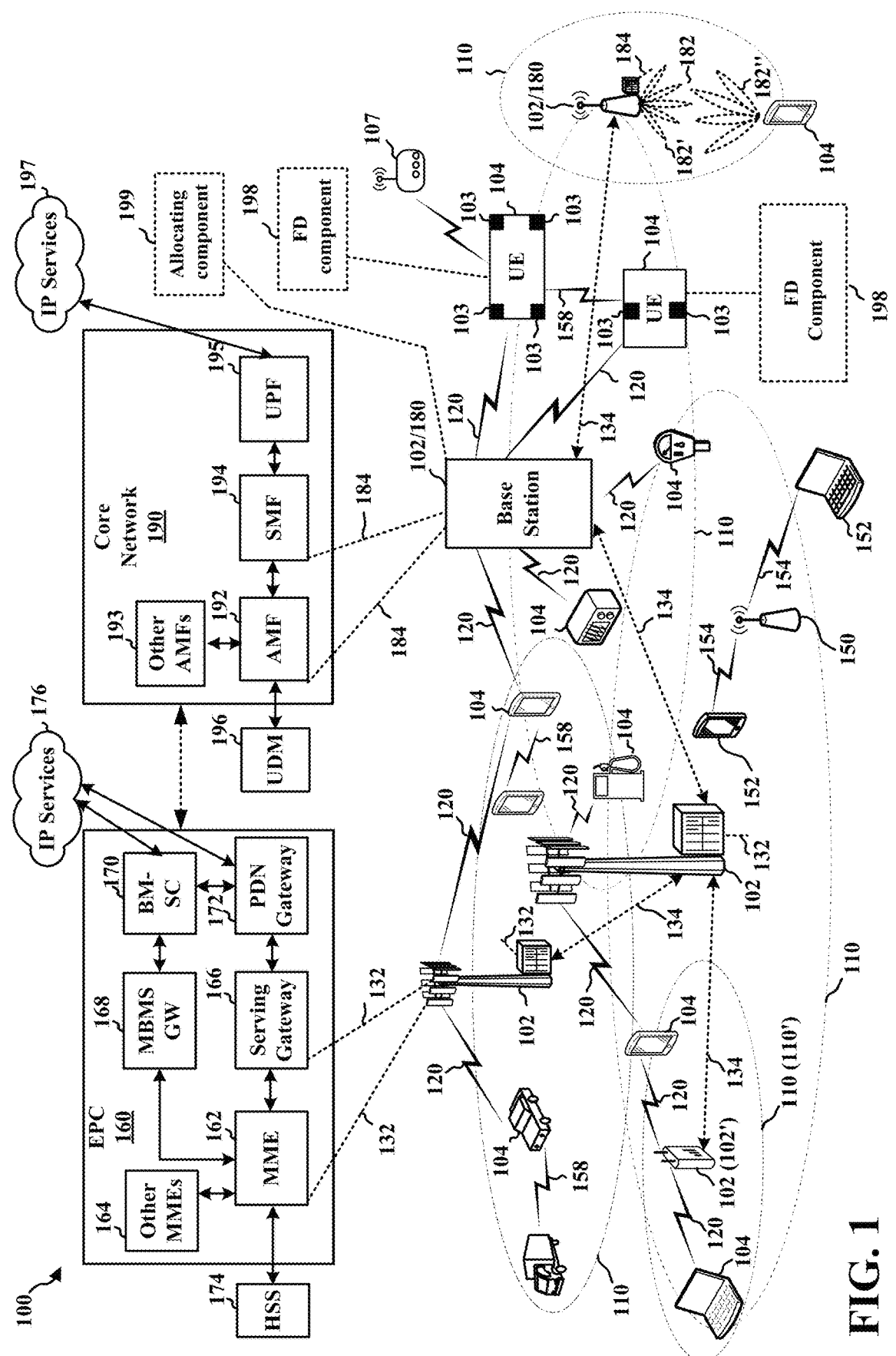
FIG. 1 is a diagram illustrating an example of a wireless communications system and an access network including sidelink communication.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable storage medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A UE may include multiple transmitter-receiver points (TRPs). For example, a vehicle may have multiple antenna panels, such as a front antenna panel and a rear antenna panel. Larger vehicles may have more than two TRPs. Although examples are provided for vehicular sidelink communication, the aspects presented here are applicable to non-vehicular UEs and are not limited to a vehicle application. Using multiple TRPs may improve reliability, coverage, and overall performance of the communication.

A UE performing full-duplex communication by enabling TRPs of the UE to transmit and receive simultaneously (e.g., with transmission and reception overlapping in time at least partially) on the same frequency and time radio resource may be capable of doubling the communication link capacity compared to half-duplex communication. For UEs that may communicate via different communication interfaces, such as via a Uu interface with a base station and via a sidelink interface with other UEs, a UE may enable concurrent transmission and reception via the different communication interfaces. As used herein, "concurrent" means at least partially overlapping in time. However, for UEs capable of such full-duplex communication, in some situations, self-interference from a transmitting panel to a receiving panel of the UE may be too high, preventing the full-duplex communication to be efficient. Aspects provided herein enable a UE to determine whether to activate full-duplex communication that includes concurrent transmission and reception via different communication interfaces.

FIG. 1 illustrates UEs 104 having multiple TRPs 103. TRPs are different radio frequency (RF) modules having a shared hardware and/or software controller. A UE 104 may schedule sidelink communication per TRP 103. In some examples, the UE 104 may have the capability to concurrently communicate via the multiple TRPs 103, e.g., communication via different TRPs that overlaps in time. For example, the UE 104 may transmit a first transmission via a first TRP that overlaps in time, at least partially, with a second transmission via a second TRP. In some examples, the UE 104 may be capable of full-duplex communication in which the UE transmits via one TRP concurrently with reception via a second TRP. For example, a UE may transmit a sidelink transmission via a front antenna panel while receiving sidelink communication via a rear antenna panel. The multi-TRP equipped on the UE 104 may improve reliability in safety and data coverage.

In a first sidelink resource allocation mode, a UE may receive a resource allocation for sidelink communication from a central entity, such as a base station 102 or 180. The sidelink resource allocation from a base station may be referred to as "resource allocation mode 1" or a "centralized" resource allocation mode, e.g., in which a network entity allocates sidelink resources for multiple UEs. In a second resource allocation mode, a UE 104 may autonomously determine resources for sidelink transmissions by sensing, or monitoring, for reservations of other UEs. The autonomous resource selection may be referred to as "resource allocation mode 2," a "decentralized" resource allocation mode, or a sensing-based sidelink resource allocation mode, e.g., where each UE selects its own sidelink resources for sidelink transmissions. In the decentralized sidelink resource allocation mode, rather than receiving an allocation of sidelink resources from a network entity, a UE 104 may determine the sidelink transmission resource(s) based on a sensing and resource reservation procedure.

Aspects presented herein enable full-duplex communication that simultaneously utilizes a sidelink interface, such as a PC5 interface, and a Uu interface. For example, the UE 104 capable of full-duplex communication may simultaneously transmit via a UU interface to a base station and receive a sidelink communication from another UE via the PC5 interface. For example, the UE 104 may include an FD component 198 configured to transmit a Uu signal from the UE 104. The FD component 198 may be further configured to perform a SIM of the Uu signal for full-duplex reception at the UE 104 using the sidelink interface. The base station 102/180 may include an allocating component 199 configured to receive, from the UE 104, full-duplex information for a full-duplex mode including Uu transmission and sidelink reception at the UE 104 and allocate one or more resources based on the full-duplex information from the UE 104.

FIG. 1 is a diagram illustrating an example of a wireless communications system and an access network 100 including base stations 102 and 180 and UEs 104. A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc.

In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5GNR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
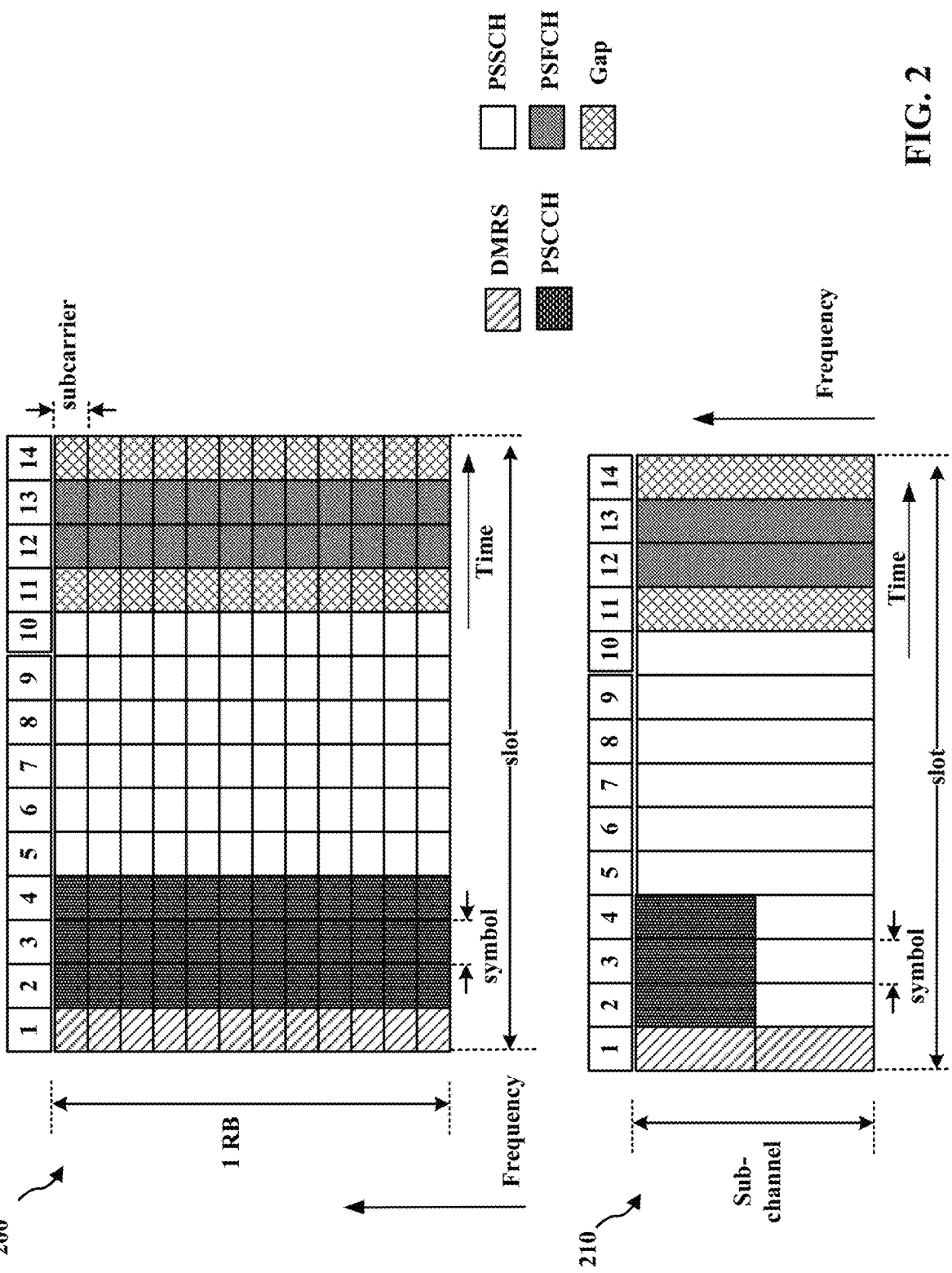
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some REs may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
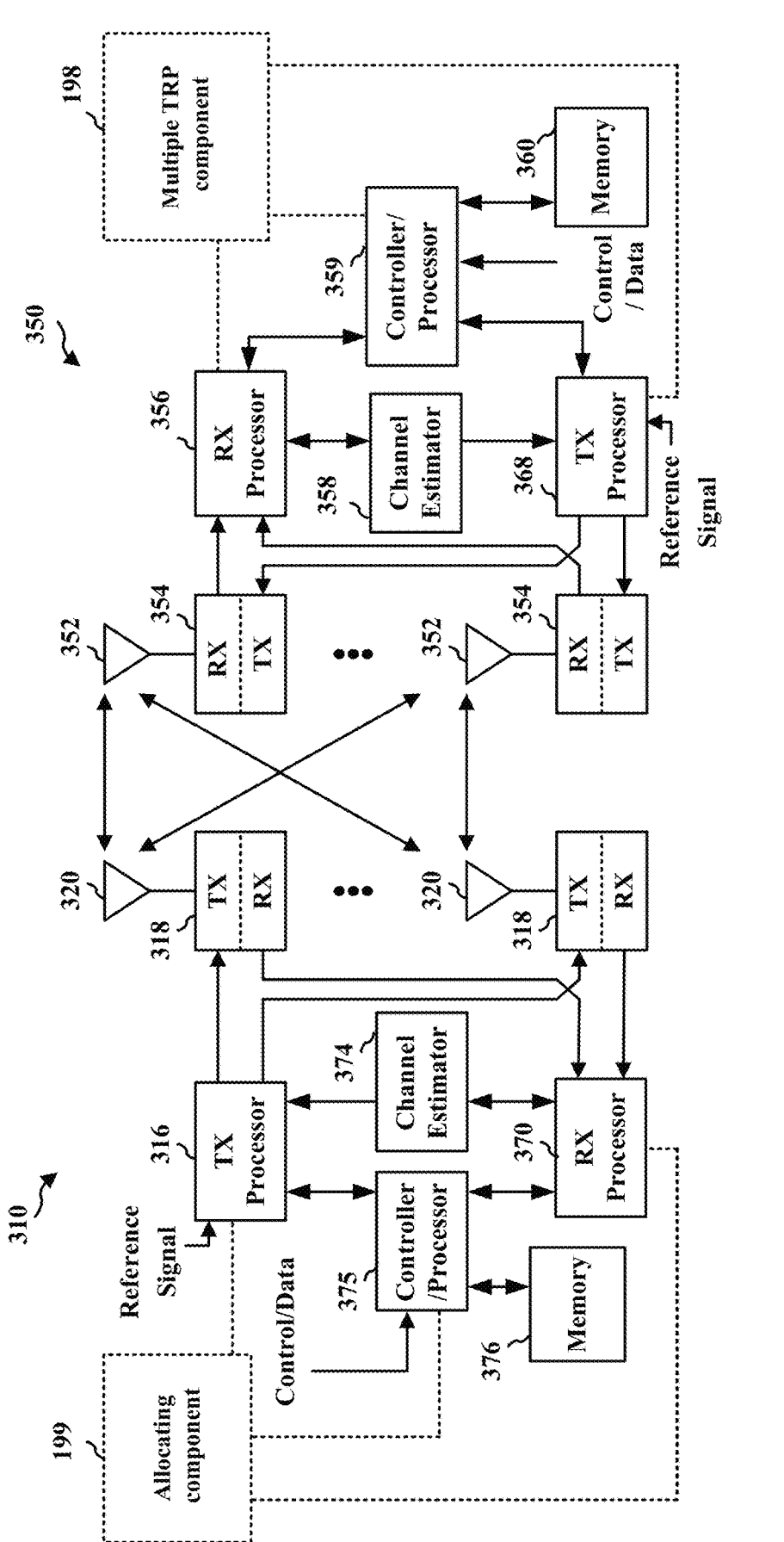
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/ processor 359, which implements layer 3 and layer 2 functionality.

The controller/processor 359 can be associated with a memory 360 that stores program codes and data. The memory 360 may be referred to as a computer-readable storage medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable storage medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

As illustrated in FIG. 3, at least one of the TX processor 368, the RX processor 356, and the controller/processor 359 may be configured to perform aspects in connection with the FD component 198 of FIG. 1.

As illustrated in FIG. 3, at least one of the TX processor 316, the RX processor 370, and the controller/processor 375 may be configured to perform aspects in connection with the allocating component 199 of FIG. 1.

A UE may include multiple TRPs. For example, a vehicle may have multiple antenna panels, such as a front antenna panel and a rear antenna panel. Larger vehicles may have more than two TRPs. FIG. 4 is a diagram 400 showing an example with UEs 402 and 406 having two TRPs 401*a* and 401*b*, e.g., a front antenna panel and a rear antenna panel. FIG. 4 also illustrates a UE 408 associated a larger vehicle having more than two TRPs 401*a* and 401*b*. Although examples are provided for vehicular sidelink communication to illustrate the concept, the aspects presented here are applicable to non-vehicular UEs and are not limited to a vehicle application.

Figures 4A, 4B:
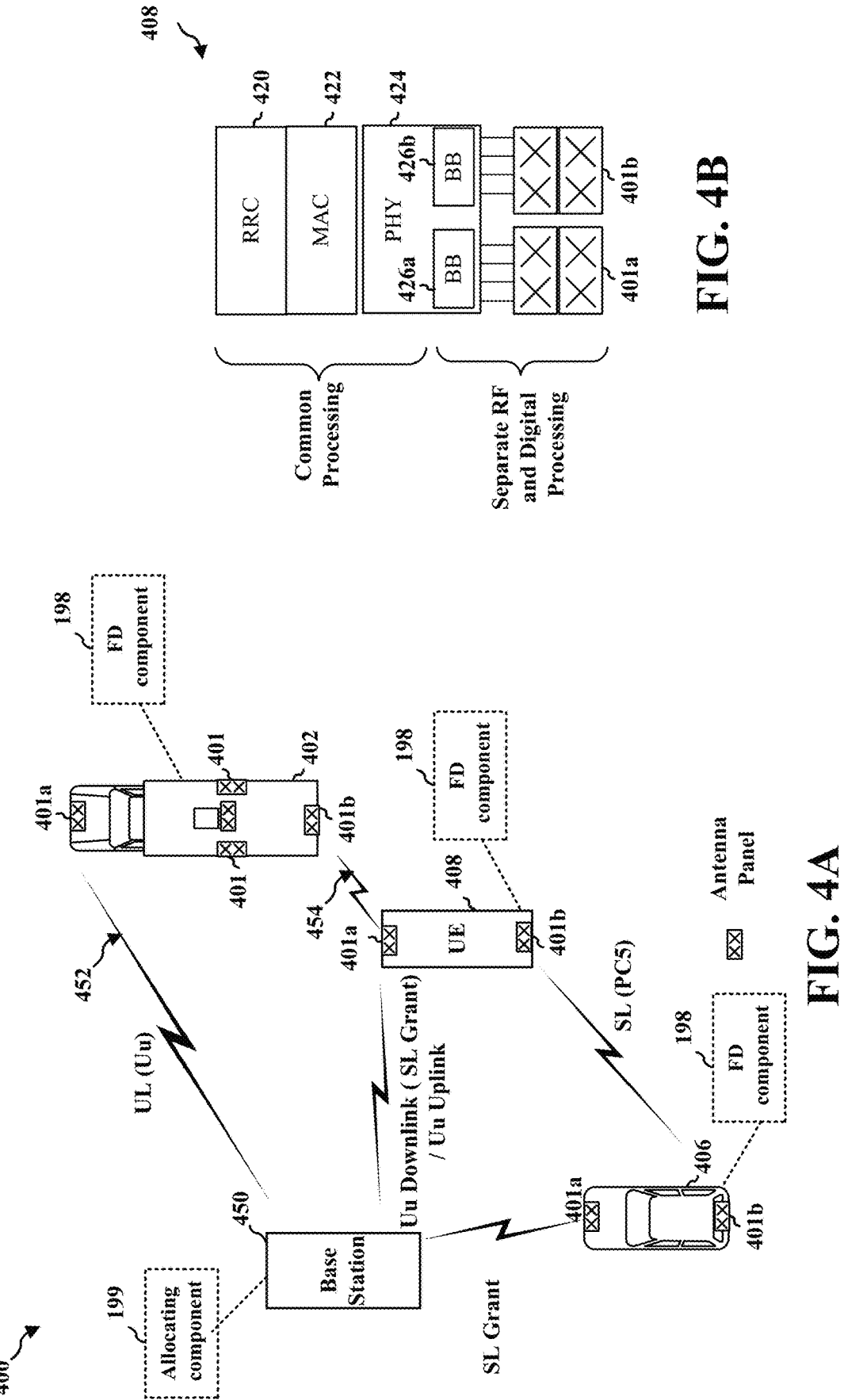
FIG. 4A illustrates examples of UEs having multiple TRPs and communications between the UEs and a base station.
FIG. 4B is a diagram illustrating the common processing and the separate processing for multiple TRPs of a sidelink device.

Each TRP comprises different RF modules having a shared hardware and/or software controller. For example, each TRP may have separate RF and digital processing. Each TRP may perform separate baseband processing. Each TRP may comprise a different antenna panel or a different set of antenna elements of a UE. The TRPs of the UE may be physically separated. For example, TRPs on a vehicle may be located at different locations of the vehicle. As an example, front and rear antenna panels on a vehicle may be separated by 3 meters, 4 meters, etc. The spacing between TRPs may vary based on the size of a vehicle and/or the number of TRPs associated with the vehicle. Each of the TRPs may experience a channel differently (e.g., experience a different channel quality) due to the difference physical location, the distance between the TRPs, different line-of-sight (LOS) characteristics (e.g., a LOS channel in comparison to a non-LOS (NLOS) channel), blocking/obstructions, interference from other transmissions, among other reasons. FIG. 4B illustrates a diagram 475 showing the processing at the RRC layer 420, MAC layer 422, and part of the PHY layer 424 for multiple TRPs 401a and 401b that is common to both TRP 401a and TRP 401b. FIG. 4B illustrates that each TRP may have separate RF and digital processing. Each TRP may perform separate baseband processing 426a and 426b. Each TRP may comprise a different antenna panel or a different set of antenna elements (e.g., 401a and 401b) of a sidelink device.

Figures 5A, 5B:
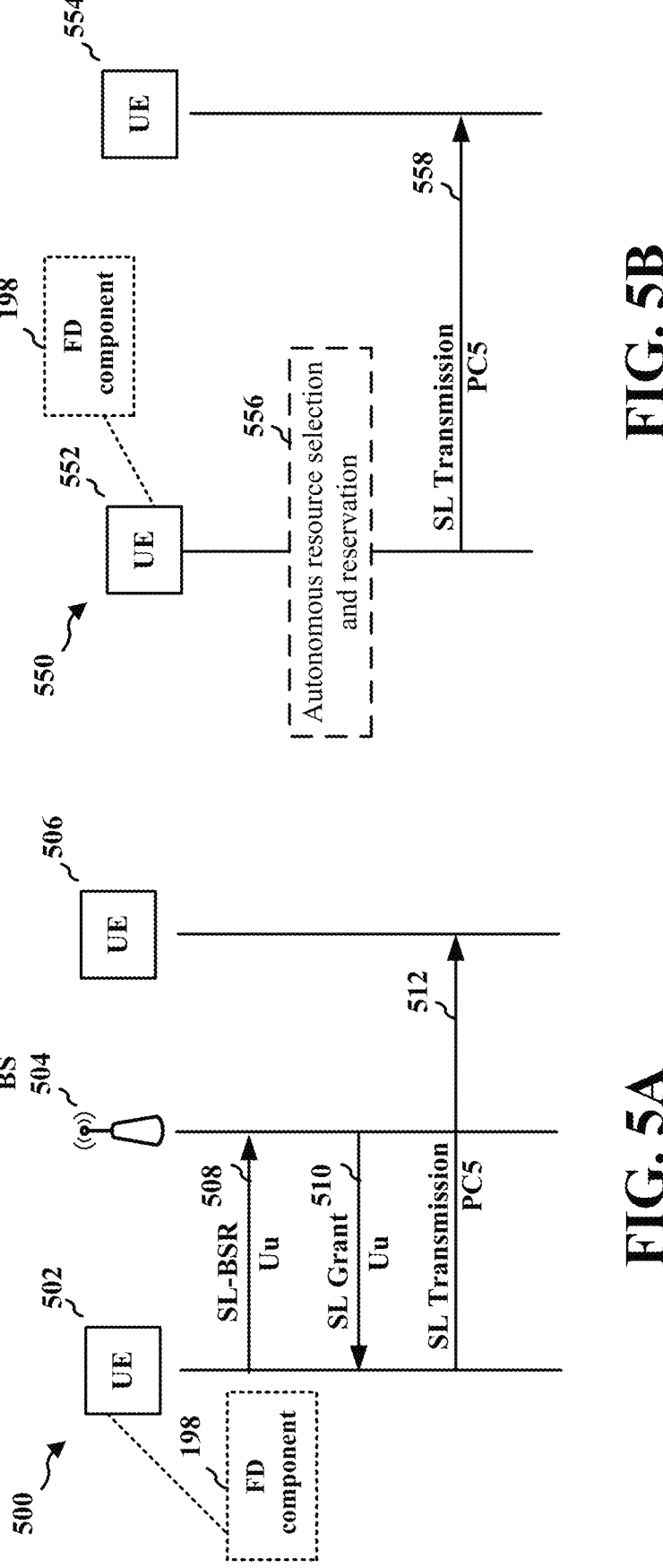
FIGS. 5A and 5B illustrate examples of resource allocation mode 1 and resource allocation mode 2.

In a first sidelink resource allocation mode, a UE may receive a resource allocation for sidelink communication from a central entity, such as a base station 450. The sidelink resource allocation from a base station may be referred to as "resource allocation mode 1" or a "centralized" resource allocation mode, e.g., in which a network entity allocates sidelink resources for multiple UEs. In a second resource allocation mode, a UE may autonomously determine resources for sidelink transmissions by sensing, or monitoring, for reservations of other UEs. The autonomous resource selection may be referred to as "resource allocation mode 2," a "decentralized" resource allocation mode, or a sensing-based sidelink resource allocation mode, e.g., where each UE selects its own sidelink resources for sidelink transmissions. In the decentralized sidelink resource allocation mode, rather than receiving an allocation of sidelink resources from a network entity, a UE 104 may determine the sidelink transmission resource(s) based on a sensing and resource reservation procedure. FIGS. 5A and 5B illustrate example 500 of resource allocation mode 1 and example 550 of resource allocation mode 2. As illustrated in FIG. 5A, under resource allocation mode 1, a UE 502 may transmit a sidelink buffer status report (SL BSR) 508 via a Uu interface to a base station 504. After receiving the SL BSR 508, the base station 504 may transmit a sidelink grant 510 that allocates sidelink time and frequency resources via downlink control information (DCI) to the UE 502. The SL grant 510 may be transmitted via the Uu interface. Based on the allocated time and frequency resources in the sidelink grant 510, the UE 502 may transmit a sidelink transmission 512 via a PC5 interface to the UE 506. As illustrated in FIG. 5B, under resource allocation mode 2, a UE 552 may autonomously select and reserve transmission resources at 556 and transmit a sidelink transmission 558 to the UE 554 based on the reserved transmission resources. In some aspects, the UE 502 and the UE 552 may include the FD component 198.

A UE may support full-duplex sidelink communications which may, in theory, double the link capacity by enabling radio network nodes to transmit and receive simultaneously on the same frequency and time radio resource. FD is not subject to half-duplex (HD) operation constraints where transmission and reception either differ in time or in frequency.

Figures 11A, 11B, 11C:
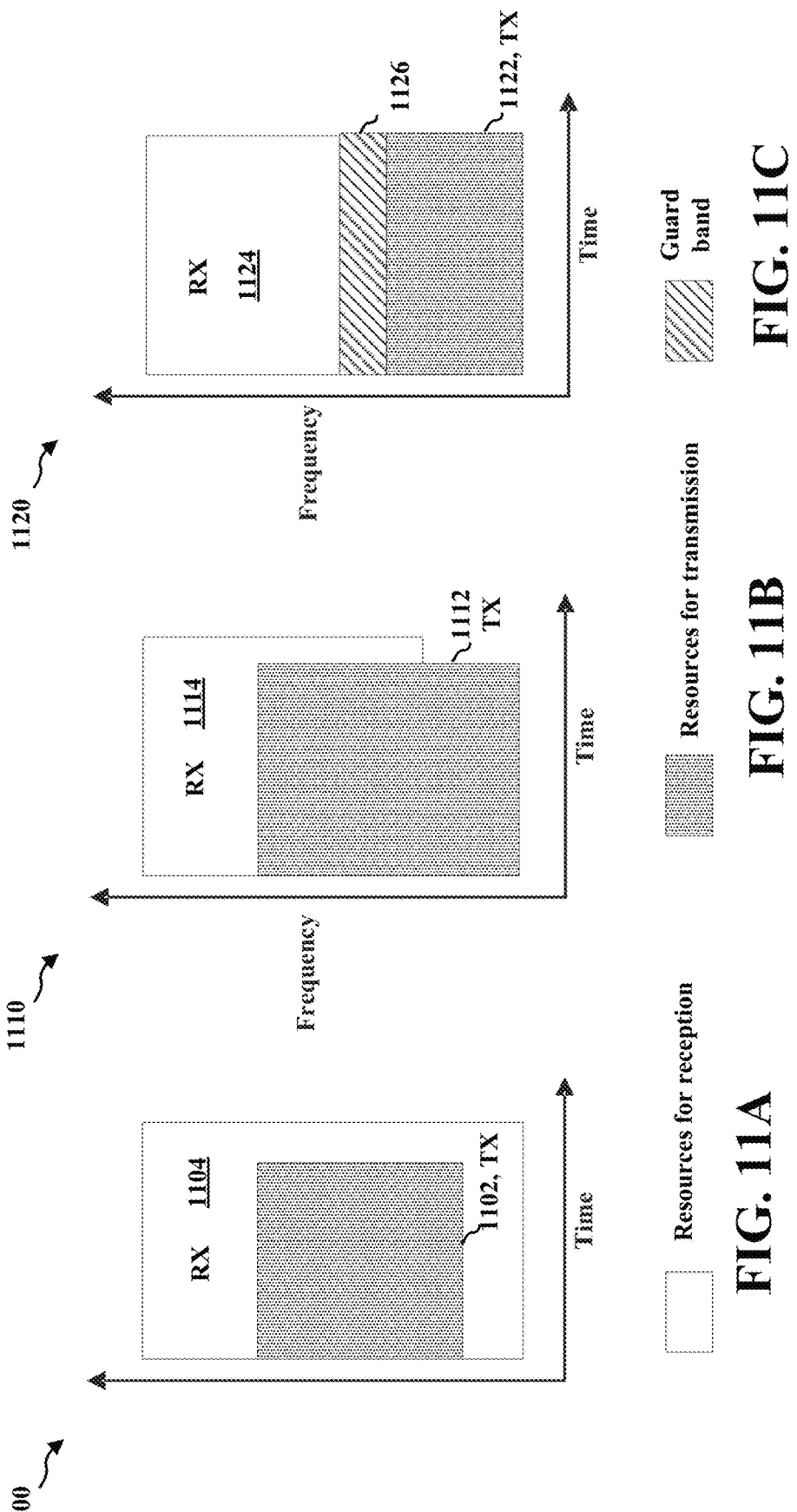
FIGS. 11A-C illustrate various types of full-duplex communication.

FIG. 11A illustrates an example 1100 of in-band full duplex (IBFD) resources (which may also be referred to as single-frequency full-duplex). FIG. 11B illustrates an example 1110 of IBFD resources. FIG. 11C illustrates an example 1120 of sub-band full-duplex resources. In IBFD, signals may be transmitted and received in overlapping times and overlapping in frequency. As shown in the example 1100 illustrated in FIG. 11A, a time and a frequency allocation of transmission resources 1102 may fully overlap with a time and a frequency allocation of reception resources 1104. In the example 1110 illustrated in FIG. 11B, a time and a frequency allocation of transmission resources 1112 may partially overlap with a time and a frequency of allocation of reception resources 1114.

IBFD is in contrast to sub-band frequency division duplex (FDD), where transmission and reception resources may overlap in time using different frequencies, as shown in the example 1120 illustrated in FIG. 11A. In the example 1120, the transmission resources 1122 are separated from the reception resources 1124 by a guard band 1126. The guard band may be frequency resources, or a gap in frequency resources, provided between the transmission resources 1122 and the reception resources 1124. Separating the frequency resources for transmission and reception with a guard band may help to reduce self-interference. Transmission and reception resources that are immediately adjacent to each other may be considered as having a guard band width of 0. As an output signal, e.g., from a UE transmitter may extends outside the transmission resources, the guard band may reduce interference experienced by the UE. Sub-band FDD may also be referred to as "flexible duplex".

A full-duplex network node, such as a base station or UE in the cellular network, may communicate simultaneously in UL and DL with two half-duplex panels using the same radio resources. Due to the simultaneous Tx/Rx nature of full-duplex communication, a UE may experience self-interference caused by signal leakage from the transmitting panel to the receiving panel. Such interference (e.g., self-interference or interference caused by other devices) may impact the quality of the communication or even lead to a loss of information. Cluster interference from surrounding objects may also be present. Therefore, a UE capable of FD communication may not always work in FD mode due to the potentially high interference.

For multi-TRP UEs, the UE may be able to perform simultaneous transmission and reception using the same time-frequency radio resource with different portions of TRPs. Such separation may provide less self-interference. Aspects provided herein enable full-duplex communication where an FD capable multi-TRP UE may be able to decide whether or when to request FD transmission from base station in resource allocation mode 1. For example, the FD capable UE may indicate the spatial configuration and other information to a base station so that the base station can accordingly grant proper time-frequency resource to enable FD communication on Uu and SL links. The base station may schedule self-interference measurement resources so that UE can get an accurate measurement to trigger simultaneous transmission and reception with multi-TRP. The UE may be able to determine whether and when to request concurrent communication between UL transmission and SL reception based on the self-interference measurement. Higher spectral efficiency may be achieved.

Referring again to FIG. 4, the UE 408 may be such an FD capable UE and the UE 408 may be able to transmit and receive packets on the same/overlapping time-frequency resource with different TRP on a UL link, such as a Uu link, and a SL link, such as a PC5 link. The UE 408 may simultaneously maintain several links on SL and Uu (e.g., UL), such as UL link 452 with a base station 450 and a SL link 454 with the UE 402. The UE 408 may transmit UL data to the base station 450 and receive SL packets from other UEs, such as the UE 402. The UE 408 may receive from one or more UE(s) on sidelink using a set of Rx beams, i.e., spatial configurations. For each of the SL Rx beam (or 'RCI'), based on self-interference measurement results, the UE 408 may determine: 1) a set of time slot on which the UE

408 may expect to receive on SL using that SL beam and 2) One or more UL transmission configuration indicator (TCI) states which the UE 408 can transmit UL data in single frequency FD (SFFD) or subband FD mode along with the receiving on SL using that Rx beam, based on beam correspondence measurement. Thus, the UE may perform measurements for each UL TCI state relative to each sidelink reception beam. The UE may determine a pair of beams (e.g., a sidelink beam and an UL TCI state) based on the SIM. The base station 450 may include the allocating component 199 and the UE 408 may include the FD component 198.

In some aspects, the UE 408 may request FD communication between UL transmission (e.g., via UU link) and SL reception (e.g., via PC5 link). For example, as illustrated in example 600 of FIG. 6A, the UE 408 may transmit an indication 619 to the base station 450 that indicates a set of SL slots on which the UE 408 is capable of UL transmissions and the corresponding configuration. In some aspects, the indication 619 is transmitted in radio resource control (RRC) message, such as being part of semi-static RRC configurations. In some aspects, the indication 619 includes a set of SL time slots on which the UE 408 can transmit on UL in SFFD or sub-band SL. In some aspects, for SFFD or sub-band FD, frequency separation requirements may be included in the indication 619. The indication 619 may additionally include a source identifier (ID) of the SL Tx UE (i.e., the UE 408) or destination ID for the UE that intends to receive from in those set of SL slots. The base station 450 may accordingly transmit one or more SL grants 612 to other UEs, such as the UE 402 and the UE 406, based on the SL information in the indication 619 provided by the UE 408. The base station 450 may also transmit a UL grant 614 to the UE 408 based on the SL information in the indication 619 provided by the UE 408.

In some aspects, the indication 619 may include a set of UL TCI states that the UE 408 can use for UL transmissions, based on beam correspondence. In some aspects, the indication 619 may additionally include limited UL capability during the SFFD/subband FD on the SL slots, e.g., power headroom report, timing advance adjustment, or the like.

Thus, the indication 619 may include any combination of spatial resource information, time resource information, sidelink information, or UE capability information relating to full-duplex communication at the UE 408.

Upon receiving a request 610, the base station 450 may transmit a set of self-interference measurement resources 615 to the UE 408. In some aspects, the set of self-interference measurement resources 615 may be semi-statically allocated (e.g., if the FD capability of the UE 408 is known by the base station 450, such as based on request 610 or other information). In some aspects, the set of self-interference measurement resources 615 may be a set of period or aperiodic sounding reference signal (SRS) resources. In some aspects, the base station 450 may configure the set of self-interference measurement resources 615 such that the set of self-interference measurement resources 615 is substantially interference-free, or have reduced interference, so that an accurate measurement may be derived by the UE 408. Based on the set of self-interference measurement resources 615, the UE 408 may transmit a Uu signal 613 from one TRP and simultaneously receive the Uu signal 613 at another TRP of the UE to perform SIM, at 616, to measure interference that UE may experience at the second TRP when receiving sidelink communication at the second TRP and transmitting Uu communication at the first TRP in a full-duplex mode. FIG.

Figures 6A, 6B:
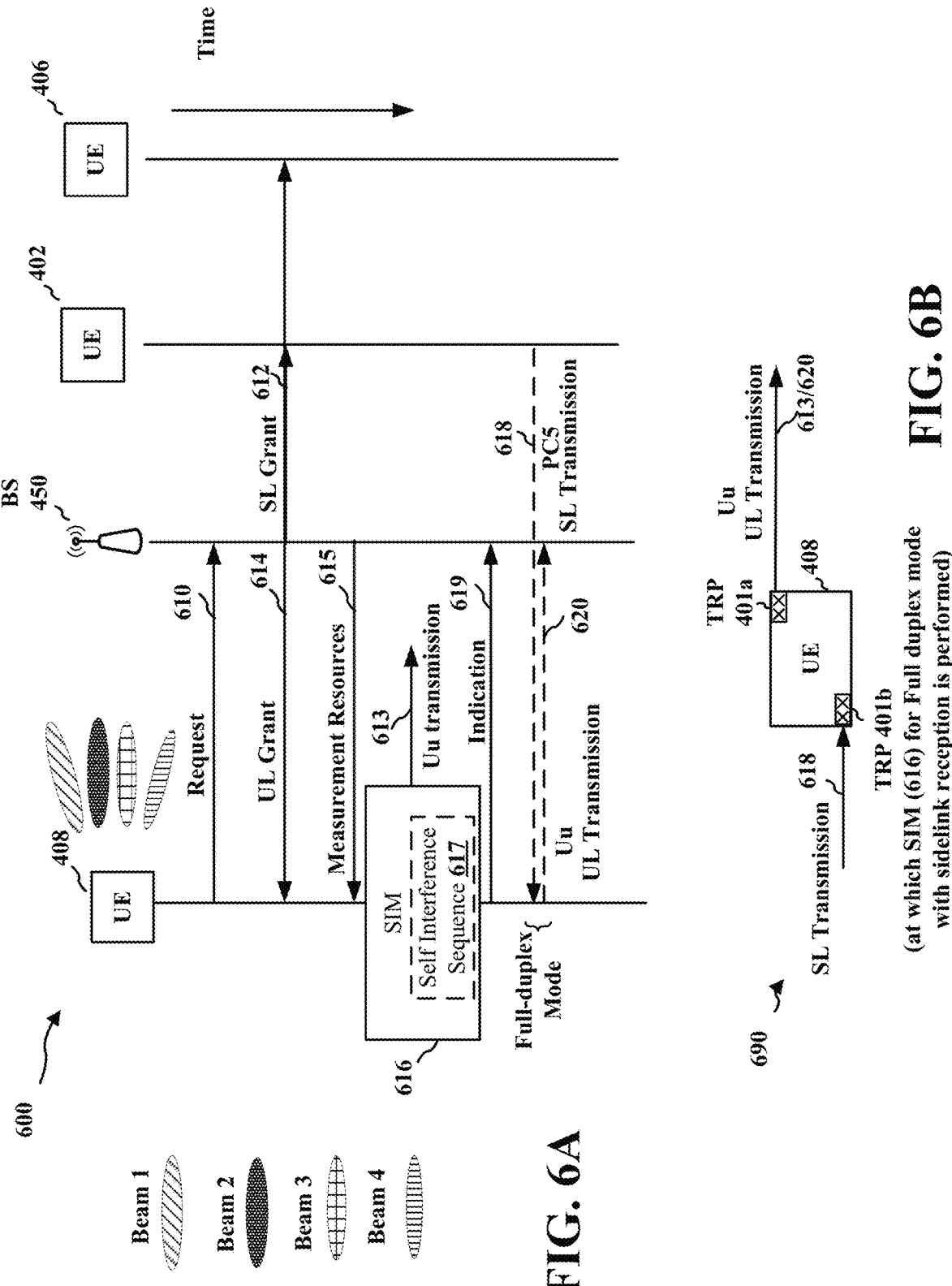
FIGS. 6A and 6B illustrate example communications between a base station and one or more UEs.

6B illustrates a diagram 690 of wireless transmission and reception at a UE 408 that may transmit the Uu signal 613 from TRP 401*a* and perform the SIM measurement 616 at TRP 401*b*. For example, as illustrated at 617, the UE 408 may transmit a self-interference sequence on granted time-frequency resource with a portion of UE 408's TRPs and measures the self-interference with another/remaining TRPs with the Rx beam receiving on SL. For example, the UE 408 may measure the self-interference in each of the beams 1-4 illustrated in FIG. 6A. The UE 408 may also determine UL TCI and Rx beam used for transmitting and receiving/measure self-interference resource. In some aspects, the UE 408 may, based on the self-interference measurement 616, operate in the full-duplex mode simultaneously perform UL transmission 620 and SL reception 618 on different TRPs of the UE 408. Referring now to FIG. 6B, the UE 408 may simultaneously perform UL transmission 620 and SL reception 618 on different TRPs 401*a* and 401*b*.

FIG. 7 is a flowchart 700 of a method of wireless communication. The method may be performed by a multi-TRP UE having a Uu connection with a base station and having a capability for full-duplex communication based on the Uu connection and a sidelink interface. For example, the method may be performed by the UE 104, the UE 408, or the apparatus 802. Optional aspects are illustrated with a dashed line. The method may enable full-duplex communications on sidelink and uplink links.

At 702, the UE may transmit an uplink request to the base station for a SIM resource for the SIM at the UE using the PC5 interface. For example, 702 may be performed by uplink request component 842 in FIG. 8. In some aspects, the uplink request may correspond to the request 610 illustrated in FIG. 6A.

At 704, the UE may receive an allocation of one or more SIM resources from the base station in response to the uplink request, e.g., from the base station 450. For example, 704 may be performed by SIM resource component 844 in FIG. 8. In some aspects, the one or more SIM resources may correspond to the set of self-interference measurement resources 615 illustrated in FIG. 6A. In some aspects, the allocation comprises a semi-static resource allocation. In some aspects, the allocation comprises a periodic SRS resource. In some aspects, the allocation comprises an aperiodic SRS resource.

At 706, the UE may transmit a Uu signal from the UE. For example, 702 may be performed by Uu signal component 846 in FIG. 8. FIG. 6A illustrates an example of the UE 408 transmitting a Uu signal 613. The UE 408 may transmit the Uu signal from TRP 401*a*, as illustrated in FIG. 6B.

In some aspects, the one or more SIM resources of the allocation includes a time and frequency resource. At 708, as part of transmitting the Uu signal, the UE may transmit the self-interference sequence in the time and frequency resource based on the allocation, such as by the base station 450. In some aspects, the Uu signal 613 may comprise the self-interference sequence 617, as illustrated in FIG. 6A. For example, 708 may be performed by self-interference sequence component 848 in FIG. 8.

At 710, the UE may perform a SIM of the Uu signal for full-duplex reception at the UE using the sidelink interface. For example, 710 may be performed by SIM component 850 in FIG. 8. FIG. 6A illustrates an example of the UE 408 performing SIM 616 by measuring reception of the Uu signal 613 that is transmitted by the UE 408. In some aspects, the UE transmits the Uu signal from a first TRP of the UE and performs the SIM for the full-duplex reception at one or more candidate TRPs of the UE, wherein each of the one or more candidate TRPs is different than the first TRP from which the Uu signal is transmitted. FIG. 6B illustrates an example in which the UE 408 transmits the Uu signal 613 from the TRP 401a and performs the SIM at TRP 401b. In some aspects, the UE performs the SIM for the full-duplex reception at multiple candidate TRPs of the UE. In some aspects, the UE transmits the Uu signal from a first set of antenna elements comprised in an antenna array of the UE and performs the SIM for the full-duplex reception at a second set of antenna elements comprised in the antenna array of the UE. In some aspects, UE transmits the self-interference sequence using one or more candidate uplink TCI states and performing the SIM may further include performing the SIM for each of a set of one or more sidelink reception beams paired with the one or more candidate uplink TCI states.

At 712, as part of 710, the UE may determine one or more combinations of an uplink TCI state and a sidelink reception beam for performing the full-duplex communication. For example, 712 may be performed by UL TCI determining component 852 in FIG. 8.

At 714, the UE may transmit, to the base station, full-duplex information based on the SIM of the Uu signal for the full-duplex reception at the UE using the sidelink interface. For example, 714 may be performed by FD information component 854 in FIG. 8. In some aspects, the full-duplex information may correspond to the indication 619 illustrated in FIG. 6A. In some aspects, the full-duplex information comprises an uplink TCI state associated with one or more uplink beams on which the UE supports Uu transmission on the one or more beams and reception on a sidelink beam in a full-duplex mode. In some aspects, the full-duplex information comprises a time parameter during which the UE has the capability for uplink transmission using the TCI state and sidelink reception in the full-duplex mode. In some aspects, the time parameter comprises a set of one or more slots. In some aspects, the full-duplex information comprises ID information for a sidelink device from which the UE will receive sidelink communication during the set of one or more slots. In some aspects, the ID information comprises at least one of a source ID or a destination ID. In some aspects, the full-duplex information comprises a full-duplex configuration supported by the UE. In some aspects, the full-duplex configuration comprises a single frequency full-duplex configuration. In some aspects, the full-duplex configuration comprises a sub-band full-duplex configuration including a frequency separation parameter. In some aspects, the full-duplex information indicates an uplink capability that the UE supports in a full-duplex mode that is different than the UE supports in a half-duplex mode. In some aspects, the full-duplex information comprises a timing advance adjustment or a power headroom report that the UE supports in a full-duplex mode and not in a half-duplex mode. In some aspects, the UE transmits the full-duplex information to the base station in RRC signaling.

Figure 8:
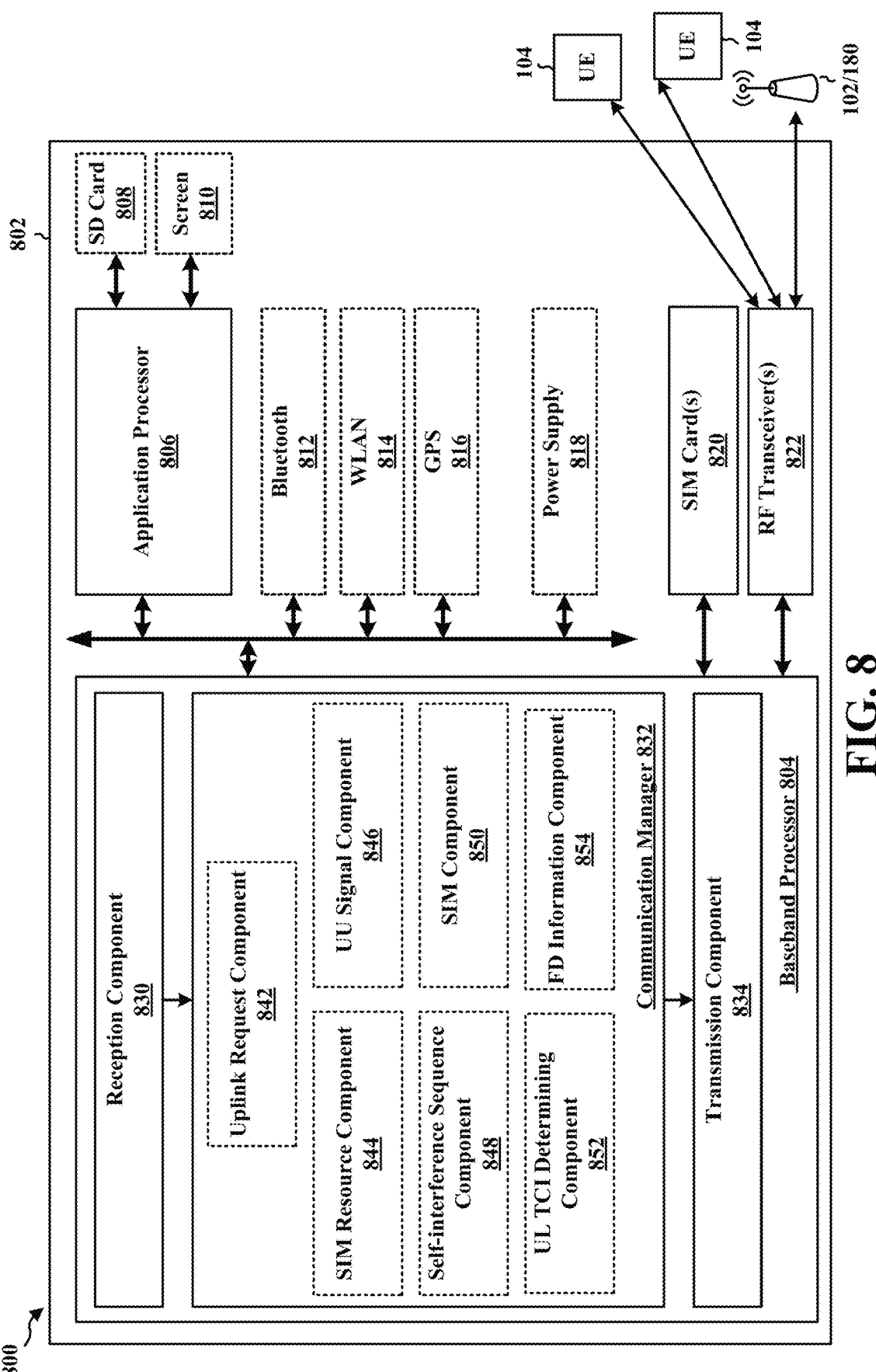
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a baseband processor 804 (also referred to as a modem) coupled to a RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The baseband processor 804 communicates through the RF transceiver 822 with the UE 104 and/or BS 102/180. The baseband processor 804 may include a computer-readable medium/memory. The computer-readable medium/memory may be non-transitory. The baseband processor 804 is responsible for general processing, including the execution of software stored on the computer-readable medium/memory. The software, when executed by the baseband processor 804, causes the baseband processor 804 to perform the various functions described supra. The computer-readable medium/memory may also be used for storing data that is manipulated by the baseband processor 804 when executing software. The baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband processor 804. The baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 may include an uplink request component 842 that is configured to transmit an uplink request to the base station for a SIM resource for the SIM of the Uu signal for the full-duplex reception at the UE using the sidelink interface, e.g., as described in connection with 702 in FIG. 7. The communication manager 832 may further include a SIM resource component 844 that is configured to receive an allocation of one or more SIM resources from the base station in response to the uplink request, e.g., as described in connection with 704 in FIG. 7. The communication manager 832 may further include a Uu signal component 846 that is configured to transmit a Uu signal from the UE, e.g., as described in connection with 706 in FIG. 7. The communication manager 832 may further include a self-interference sequence component 848 that is configured to transmit a self-interference sequence in a time and frequency resource allocated by the base station, e.g., as described in connection with 708 in FIG. 7. The communication manager 832 may further include a SIM component 850 that is configured to perform a SIM of the Uu signal for full-duplex reception at the UE using the sidelink interface, e.g., as described in connection with 710 in FIG. 7. The communication manager 832 may further include a UL TCI determining component 852 that is configured to determine one or more combinations of an uplink TCI state and a sidelink reception beam for performing the full-duplex communication, e.g., as described in connection with 712 in FIG. 7. The communication manager 832 may further include an FD information component 854 that is configured to transmit, to the base station, full-duplex information based on the SIM of the Uu signal for the full-duplex reception at the UE using the sidelink interface, e.g., as described in connection with 714 in FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband processor 804, includes means for transmitting a Uu signal from the UE, such as the transceiver 822. The baseband processor 804 may further include means for performing a SIM of the Uu signal for full-duplex reception at the UE using the sidelink interface, such as the transceiver 822. The baseband processor 804 may further include means for transmitting, to the base station, full-duplex information based on the SIM of the Uu signal for the full-duplex reception at the UE using the sidelink interface, such as the transceiver 822. The baseband processor 804 may further include means for transmitting an uplink request to the base station for a SIM resource for the SIM at the UE using the sidelink interface, such as the transceiver 822. The baseband processor 804 may further include means for transmitting a self-interference sequence in a time and frequency resource allocated by the base station, such as the transceiver 822. The baseband processor 804 may further include means for performing the SIM for each of a set of one or more sidelink reception beams paired with the one or more candidate uplink TCI states, such as the transceiver 822. The baseband processor 804 may further include means for determining one or more combinations of an uplink TCI state and a sidelink reception beam for performing the full-duplex communication.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
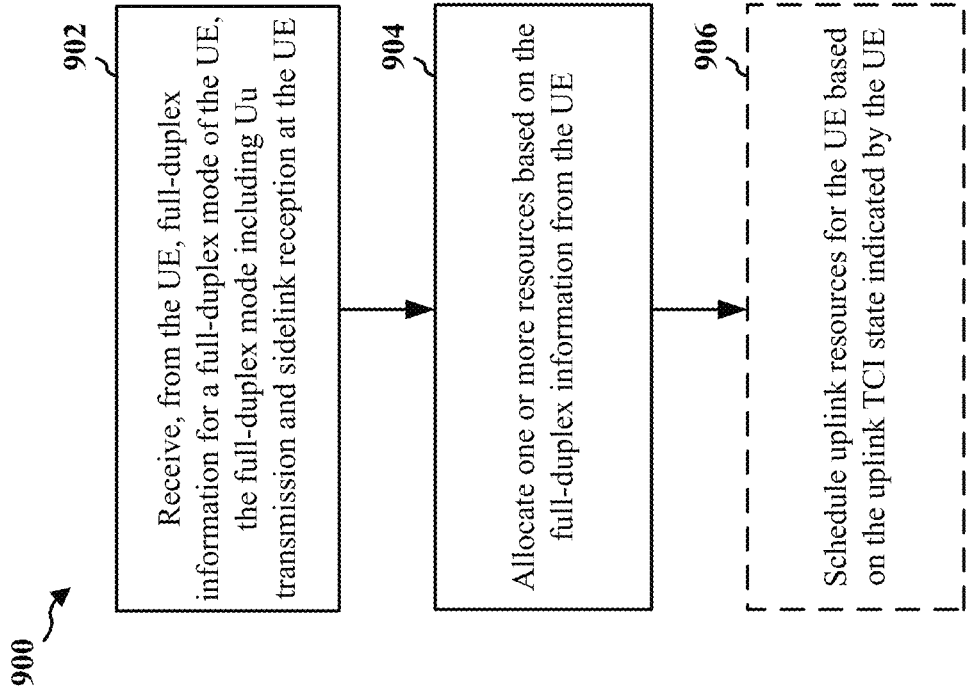
FIG. 9 is a flowchart of a method of wireless communication.

FIG. 9 is a flowchart 900 of a method of wireless communication. The method may be performed by a base station having a Uu connection with a UE. For example, the method may be performed by the base station 102/180, the base station 450, or the apparatus 1002. Optional aspects are illustrated with a dashed line. The method may enable full-duplex communications on sidelink and uplink links.

At 902, the base station may receive, from the UE, full-duplex information for a full-duplex mode of the UE, the full-duplex mode including Uu transmission and sidelink reception at the UE. For example, 902 may be performed by FD information reception component 1042 in FIG. 10. In some aspects, the full-duplex information may correspond to the request 610 illustrated in FIG. 6A. In some aspects, the full-duplex information includes a request for full-duplex communication. In some aspects, the full-duplex information includes an uplink TCI state associated with one or more uplink beams on which the UE supports Uu transmission on the one or more beams and reception on a sidelink beam in the full-duplex mode.

At 904, the base station may allocate one or more resources based on the full-duplex information from the UE. For example, 904 may be performed by allocate component 1044 in FIG. 10. In some aspects, the one or more resources may correspond to the set of self-interference measurement resources 615 illustrated in FIG. 6A. In some aspects, the one or more resources comprise one or more SIM resources for the UE to transmit an uplink signal for measurement of SIM for full-duplex sidelink reception. In some aspects, the one or more SIM resources comprise a semi-static resource allocation. In some aspects, the one or more SIM resources comprise a periodic or an aperiodic SRS resource. In some aspects, the base station may adjust UL and SL scheduling based on the full-duplex information from the UE. For example, the base station may re-configure the SL transmission timing to enable the full-duplex communication.

At 906, the base station may schedule uplink resources for the UE based on the uplink TCI state indicated by the UE. For example, 906 may be performed by schedule component 1046 in FIG. 10. In some aspects, the full-duplex information further comprises a time parameter during which the UE has a capability for uplink transmission using the TCI state and the sidelink reception in the full-duplex mode. In some aspects, the base station schedules the uplink resources for the UE further based on the time parameter indicated by the UE. In some aspects, the full-duplex information comprises ID information for a sidelink device from which the UE will receive sidelink communication, and the one or more resources comprise a sidelink allocation for an additional UE based on the ID information received from the UE.

Figure 10:
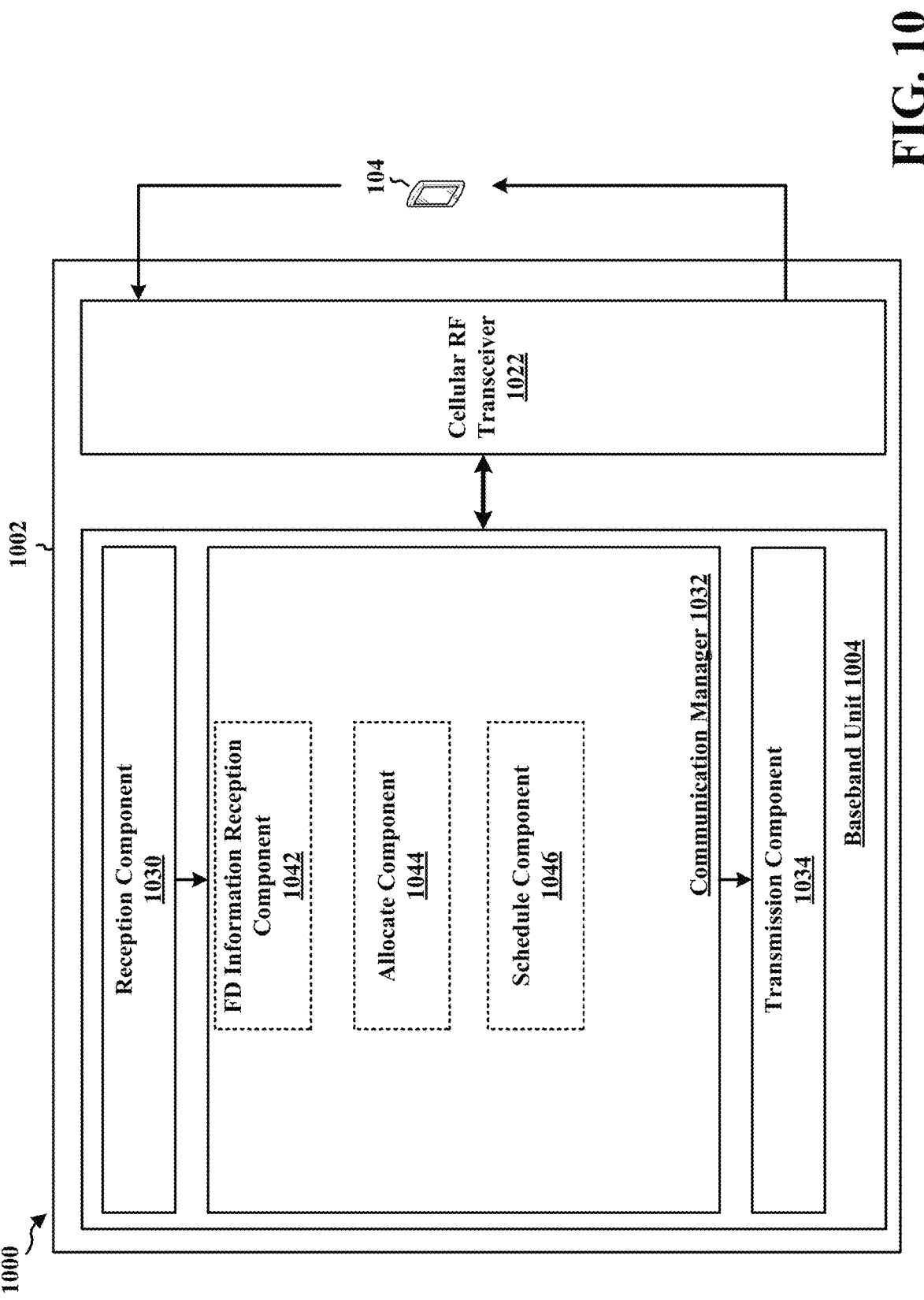
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 may include an FD information reception component 1042 that receives, from the UE, full-duplex information for a full-duplex mode including Uu transmission and sidelink reception at the UE, e.g., as described in connection with 902 in FIG. 9. The communication manager 1032 may further include an allocate component 1044 that allocates one or more resources based on the full-duplex information from the UE, e.g., as described in connection with 904 in FIG. 9. The communication manager 1032 may further include a schedule component 1046 that schedules uplink resources for the UE based on the uplink TCI state indicated by the UE, e.g., as described in connection with 906 in FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for receiving, from the UE, full-duplex information for a full-duplex mode of the UE, the full-duplex mode including Uu transmission and sidelink reception at the UE, such as the transceiver 1022. The baseband unit 1004 may further include means for allocating one or more resources based on the full-duplex information from the UE, such as the transceiver 1022. The baseband unit 1004 may further include means for scheduling uplink resources for the UE based on the uplink TCI state indicated by the UE, such as the transceiver 1022.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following example aspects are illustrative only and may be combined with other or teachings described herein, without limitation.

Aspect 1 is a method of wireless communication at a UE having a Uu connection with a base station and having a capability for full-duplex communication based on the Uu connection and a sidelink interface, comprising: transmitting a Uu signal; and performing a SIM of the Uu signal for full-duplex reception at the UE using the sidelink interface.

Aspect 2 is the method of aspect 1, wherein transmitting the Uu signal further comprises transmitting the Uu signal from a first TRP of the UE and performing the SIM comprises performing the SIM for the full-duplex reception at one or more candidate TRPs of the UE, wherein each of the one or more candidate TRPs is different than the first TRP from which the Uu signal is transmitted.

Aspect 3 is the method of any of aspects 1-2, wherein the performing the SIM further comprises performing the SIM for the full-duplex reception at multiple candidate TRPs of the UE.

Aspect 4 is the method of any of aspects 1-3, wherein transmitting the Uu signal further comprises transmitting from a first set of antenna elements comprised in an antenna array of the UE and performing the SIM comprises performing the SIM for the full-duplex reception at a second set of antenna elements comprised in the antenna array of the UE.

Aspect 5 is the method of any of aspects 1-4, further comprising: transmitting, to the base station, full-duplex information based on the SIM of the Uu signal for the full-duplex reception at the UE using the sidelink interface.

Aspect 6 is the method of any of aspects 1-5, wherein the full-duplex information comprises an uplink TCI state associated with one or more uplink beams on which the UE supports Uu transmission on the one or more beams and reception on a sidelink beam in a full-duplex mode.

Aspect 7 is the method of any of aspects 1-6, wherein the full-duplex information comprises a time parameter during which the UE has the capability for uplink transmission using the TCI state and sidelink reception in the full-duplex mode.

Aspect 8 is the method of any of aspects 1-7, wherein the time parameter comprises a set of one or more slots.

Aspect 9 is the method of any of aspects 1-8, wherein the full-duplex information comprises ID information for a UE from which the UE will receive sidelink communication during the set of one or more slots.

Aspect 10 is the method of any of aspects 1-9, wherein the ID information comprises at least one of a source ID or a destination ID.

Aspect 11 is the method of any of aspects 1-10, wherein the full-duplex information comprises a full-duplex configuration supported by the UE.

Aspect 12 is the method of any of aspects 1-11, wherein the full-duplex configuration comprises a single frequency full-duplex configuration.

Aspect 13 is the method of any of aspects 1-11, wherein the full-duplex configuration comprises a sub-band full-duplex configuration including a frequency separation parameter.

Aspect 14 is the method of any of aspects 1-13, wherein the full-duplex information indicates an uplink capability that the UE supports in a full-duplex mode that is different than the UE supports in a half-duplex mode.

Aspect 15 is the method of any of aspects 1-14, wherein the full-duplex information comprises a timing advance or a power headroom report that the UE supports in a full-duplex mode and not in a half-duplex mode.

Aspect 16 is the method of any of aspects 1-15, wherein the UE transmits the full-duplex information to the base station in RRC signaling.

Aspect 17 is the method of any of aspects 1-16, further comprising: transmitting an uplink request to the base station for a SIM resource for the SIM at the UE using the sidelink interface; and receiving an allocation of one or more SIM resources from the base station in response to the uplink request.

Aspect 18 is the method of any of aspects 1-17, wherein the one or more SIM resources of the allocation includes a time and frequency resource, and wherein transmitting the Uu signal further comprises transmitting a self-interference sequence in the time and frequency resource.

Aspect 19 is the method of any of aspects 1-18, wherein transmitting the self-interference sequence includes using one or more candidate uplink TCI states, and wherein performing the SIM further includes, and wherein performing the SIM further includes: performing the SIM for each of a set of one or more sidelink reception beams paired with the one or more candidate uplink TCI states.

Aspect 20 is the method of any of aspects 1-19, further comprising: determining one or more combinations of an uplink TCI state and a sidelink reception beam for performing the full-duplex communication.

Aspect 21 is the method of any of aspects 1-20, wherein the allocation comprises a semi-static resource allocation.

Aspect 22 is the method of any of aspects 1-21, wherein the allocation comprises a periodic SRS resource.

Aspect 23 is the method of any of aspects 1-22, wherein the allocation comprises an aperiodic SRS resource.

Aspect 24 is a method of wireless communication at a base station having a Uu connection with a UE, comprising: receiving, from the UE, full-duplex information for a full-duplex mode of the UE, the full-duplex mode including Uu transmission and sidelink reception at the UE; and allocating one or more resources based on the full-duplex information from the UE.

Aspect 25 is the method of aspect 24, wherein the full-duplex information includes a request for full-duplex communication, and wherein the one or more resources comprise one or more SIM resources for the UE to transmit an uplink signal for measurement of SIM for full-duplex sidelink reception.

Aspect 26 is the method of any of aspects 24-25, wherein the one or more SIM resources comprise a semi-static resource allocation.

Aspect 27 is the method of any of aspects 24-26, wherein the one or more SIM resources comprise a periodic or an aperiodic SRS resource.

Aspect 28 is the method of any of aspects 24-27, wherein the full-duplex information comprises an uplink TCI state associated with one or more uplink beams on which the UE supports Uu transmission and sidelink reception on a side-link beam in the full-duplex mode, the method further comprising: scheduling uplink resources for the UE based on the uplink TCI state indicated by the UE.

Aspect 29 is the method of any of aspects 24-28, wherein the full-duplex information further comprises a time param-eter during which the UE has a capability for uplink trans-mission using the TCI state and the sidelink reception in the full-duplex mode, and wherein scheduling the uplink resources for the UE further comprises scheduling the uplink resources based on the time parameter indicated by the UE.

Aspect 30 is the method of any of aspects 24-29, wherein the full-duplex information comprises ID information for a UE from which the UE will receive sidelink communication, and wherein the one or more resources comprise a sidelink allocation for an additional UE based on the ID information received from the UE.

Aspect 31 is an apparatus for wireless communication including at least one processor coupled to a memory, the memory and the at least one processor configured to imple-ment a method as in any of aspects 1 to 23.

Aspect 32 is an apparatus for wireless communication including at least one processor coupled to a memory, the memory and the at least one processor configured to imple-ment a method as in any of aspects 24 to 30.

Aspect 33 is an apparatus for wireless communication including means for implementing a method as in any of aspects 1 to 23.

Aspect 34 is an apparatus for wireless communication including means for implementing a method as in any of aspects 24 to 30.

Aspect 35 is a computer-readable medium storing com-puter executable code, where the code when executed by a processor causes the processor to implement a method as in any of aspects 1 to 23.

Aspect 36 is a computer-readable medium storing com-puter executable code, where the code when executed by a processor causes the processor to implement a method as in any of aspects 24 to 30.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equiva-lents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equip-ment (UE) comprising:

transmitting a Uu signal, wherein the UE has a Uu connection with a network node, and wherein the UE has a capability for full-duplex communication based on the Uu connection and a sidelink interface;

performing a self-interference measurement (SIM) of the Uu signal for full-duplex reception at the UE using the sidelink interface; and transmitting, to the network node, full-duplex information based on the SIM of the Uu signal for the full-duplex reception at the UE using the sidelink interface, wherein the full-duplex information indicates an uplink transmission configuration indicator (TCI) state asso-ciated with one or more uplink beams on which the UE supports Uu transmission on the one or more uplink beams and reception on a sidelink beam in a full-duplex mode.

2. The method of claim 1, wherein transmitting the Uu signal further includes transmitting the Uu signal from a first transmission reception point (TRP) of the UE, and perform-ing the SIM further includes performing the SIM for the full-duplex reception at one or more candidate TRPs of the UE, wherein each of the one or more candidate TRPs is different than the first TRP from which the Uu signal is transmitted.

3. The method of claim 2, wherein performing the SIM further includes performing the SIM for the full-duplex reception at multiple candidate TRPs of the UE.

4. The method of claim 1, wherein transmitting the Uu signal further includes transmitting from a first set of antenna elements comprised in an antenna array of the UE and performing the SIM further includes performing for the full-duplex reception at a second set of antenna elements comprised in the antenna array of the UE.

5. The method of claim 1, wherein the full-duplex information comprises a time parameter during which the UE has the capability for uplink transmission using the uplink TCI state and sidelink reception in the full-duplex mode.

6. The method of claim 5, wherein the time parameter comprises a set of one or more slots.

7. The method of claim 6, wherein the full-duplex information comprises identifier (ID) information for a transmitting UE from which the UE will receive sidelink communication during the set of one or more slots.

8. The method of claim 7, wherein the ID information comprises at least one of a source ID or a destination ID.

9. The method of claim 1, wherein the full-duplex information further indicates a full-duplex configuration supported by the UE.

10. The method of claim 9, wherein the full-duplex configuration comprises a single frequency full-duplex configuration.

11. The method of claim 9, wherein the full-duplex configuration comprises a sub-band full-duplex configuration including a frequency separation parameter.

12. The method of claim 1, wherein the full-duplex information further indicates an uplink capability that the UE supports in the full-duplex mode that is different than a second uplink capability that the UE supports in a half-duplex mode.

13. The method of claim 1, wherein the full-duplex information further indicates a timing advance adjustment or a power headroom report that the UE supports in the full-duplex mode and not in a half-duplex mode.

14. The method of claim 1, wherein the UE transmits the full-duplex information to the network node in radio resource control (RRC) signaling.

15. The method of claim 1, further comprising:

transmitting an uplink request to the network node for a SIM resource for the SIM at the UE using the sidelink interface; and receiving an allocation of one or more SIM resources from the network node in response to the uplink request.

16. The method of claim 15, wherein the one or more SIM resources of the allocation include a time and frequency resource, and wherein transmitting the Uu signal further comprises:

transmitting a self-interference sequence in the time and frequency resource.

17. The method of claim 15, wherein the allocation comprises one or more of:

a semi-static resource allocation, a periodic sounding reference signal (SRS) resource; or an aperiodic SRS resource.

18. A method of wireless communication at a user equipment (UE) comprising:

transmitting an uplink request to a network node for a self-interference measurement (SIM) resource for SIM at the UE using a sidelink interface, wherein the UE has a Uu connection with the network node, and wherein the UE has a capability for full-duplex communication based on the Uu connection and the sidelink interface;

receiving an allocation of one or more SIM resources from the network node in response to the uplink request, wherein the one or more SIM resources of the allocation include a time and frequency resource;

transmitting a Uu signal that includes a self-interference sequence in the time and frequency resource, wherein transmission of the Uu signal is based on one or more candidate uplink transmission configuration indicator (TCI) states; and performing the SIM of the Uu signal for full-duplex reception at the UE using the sidelink interface for each of a set of one or more sidelink reception beams paired with the one or more candidate uplink TCI states.

19. The method of claim 18, further comprising:

determining one or more combinations of an uplink TCI state and a sidelink reception beam for performing the full-duplex communication.

20. A method of wireless communication at a network node, comprising:

receiving, from a user equipment (UE) with which the network node has a Uu connection, full-duplex information for a full-duplex mode of the UE, the full-duplex mode including Uu transmission and sidelink reception at the UE, wherein the full-duplex information indicates an uplink transmission configuration indicator (TCI) state associated with one or more uplink beams for which the UE supports the Uu transmission and the sidelink reception on a sidelink beam in the full-duplex mode; and scheduling uplink resources for the UE based on the uplink TCI state indicated in the full-duplex information.

21. The method of claim 20, further comprising:

receiving a request for full-duplex communication; and allocating one or more self-interference measurement (SIM) resources for the UE to transmit an uplink signal for measurement of SIM for full-duplex sidelink reception.

22. The method of claim 21, wherein the one or more SIM resources comprise a semi-static resource allocation.

23. The method of claim 21, wherein the one or more SIM resources comprise a periodic or an aperiodic sounding reference signal (SRS) resource.

24. An apparatus for wireless communication at a user equipment (UE) comprising:

memory; and one or more processors coupled to the memory and configured to cause the UE to:

transmit a Uu signal, wherein the UE has a Uu connection with a network node, and wherein the UE has a capability for full-duplex communication based on the Uu connection and a sidelink interface;

perform a self-interference measurement (SIM) of the Uu signal for full-duplex reception at the UE using the sidelink interface; and transmit, to the network node, full-duplex information based on the SIM of the Uu signal for the full-duplex reception at the UE using the sidelink interface, wherein the full-duplex information indicates an uplink transmission configuration indicator (TCI) state associated with one or more uplink beams on which the UE supports Uu transmission on the one or more uplink beams and reception on a sidelink beam in a full-duplex mode.

25. The apparatus of claim 24, wherein the one or more processors are further configured to cause the UE to:

transmit an uplink request to the network node for a SIM resource for the SIM at the UE using the sidelink interface; and receive an allocation of one or more SIM resources from the network node in response to the uplink request.

26. The apparatus of claim 25, wherein the one or more SIM resources of the allocation include a time and frequency resource, and wherein to transmit the Uu signal, the one or more processors are further configured to cause the UE to:

transmit a self-interference sequence in the time and frequency resource.

27. The apparatus of claim 26, wherein a transmission of the self-interference sequence is based on one or more candidate uplink transmission configuration indicator (TCI) states, and wherein to perform the SIM, the one or more processors are configured to cause the UE to perform the SIM for each of a set of one or more sidelink reception beams paired with the one or more candidate uplink TCI states, and wherein the one or more processors are further configured to cause the UE to:

determine one or more combinations of an uplink TCI state and a sidelink reception beam for performing the full-duplex communication.

28. An apparatus for wireless communication at a network node, comprising:

memory; and one or more processors coupled to the memory and configured to cause the network node to:

receive, from a user equipment (UE) with which the network node has a Uu connection, full-duplex information for a full-duplex mode of the UE that is based on Uu transmission and sidelink reception, wherein the full-duplex information indicates an uplink transmission configuration indicator (TCI) state associated with one or more uplink beams for which the UE supports the Uu transmission and the sidelink reception on a sidelink beam in the full-duplex mode; and schedule uplink resources for the UE based on the uplink TCI state indicated in the full-duplex information.

29. The apparatus of claim 28, wherein the one or more processors are further configured to cause the network node to:

receive a request for full-duplex communication; and allocate one or more self-interference measurement (SIM) resources for the UE to transmit an uplink signal for measurement of SIM for full-duplex sidelink reception.

30. An apparatus for wireless communication at a user equipment (UE) comprising:

memory; and one or more processors coupled to the memory and configured to cause the UE to:

transmit an uplink request to a network node for a self-interference measurement (SIM) resource for SIM at the UE using a sidelink interface, wherein the UE has a Uu connection with the network node, and wherein the UE has a capability for full-duplex communication based on the Uu connection and a sidelink interface;

receive an allocation of one or more SIM resources from the network node in response to the uplink request, wherein the one or more SIM resources of the allocation include a time and frequency resource;

transmit a Uu signal that includes a self-interference sequence in the time and frequency resource, wherein transmission of the Uu signal is based on one or more candidate uplink transmission configuration indicator (TCI) states; and perform the SIM of the Uu signal for full-duplex reception at the UE using the sidelink interface for each of a set of one or more sidelink reception beams paired with the one or more candidate uplink TCI states.

31. The apparatus of claim 30, wherein the allocation comprises one or more of:

a semi-static resource allocation, a periodic sounding reference signal (SRS) resource; or an aperiodic SRS resource.

* * * * *